(12) United States Patent
Stierle et al.

(10) Patent No.: US 7,221,435 B2
(45) Date of Patent: May 22, 2007

(54) DEVICE AND METHOD FOR OPTICAL DISTANCE MEASUREMENT

(75) Inventors: Joerg Stierle, Waldenbuch (DE); Peter Wolf, Leinfelden-Echterdingen (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 10/507,996

(22) PCT Filed: May 19, 2003

(86) PCT No.: PCT/DE03/01598

§ 371 (c)(1),
(2), (4) Date: Sep. 16, 2004

(87) PCT Pub. No.: WO2004/020941

PCT Pub. Date: Mar. 11, 2004

(65) Prior Publication Data

US 2005/0151957 A1 Jul. 14, 2005

(30) Foreign Application Priority Data

Aug. 28, 2002 (DE) ................ 102 39 435

(51) Int. Cl.
*G01C 3/08* (2006.01)
(52) U.S. Cl. ................ 356/4.01; 356/4.1
(58) Field of Classification Search ............... 356/4.01
See application file for complete search history.

(56) References Cited

U.S. PATENT DOCUMENTS 6,226,076 B1    5/2001 Yoshida

| | | | | |
|---|---|---|---|---|
| 6,411,371 B1 * | 6/2002 | Hinderling et al. | ........ | 356/4.01 |
| 6,545,749 B1 * | 4/2003 | Andersson | ................ | 356/5.01 |
| 2002/0008866 A1 | 1/2002 | Ohtomo et al. | | |

FOREIGN PATENT DOCUMENTS

GB    2 336 493    10/1999

* cited by examiner

*Primary Examiner*—Thomas H. Tarcza
*Assistant Examiner*—Luke D. Ratcliffe
(74) *Attorney, Agent, or Firm*—Michael J. Striker

(57) ABSTRACT

The invention relates to a device for optical distance measurement, in particular a handheld device, having at least one light source (50, 52), disposed in a housing (10) of the device, for generating an optical measurement signal, and having a first user input unit (12) with at least one user control function (24) for emitting a modulated, optical measurement signal for the sake of a distance measurement.

According to the invention it is proposed that the device has at least one further user input unit (18) for emitting an optical signal (42).

The invention furthermore relates to a method for optical distance measurement, in particular a method for optical distance measurement by means of a handheld measuring device, in which via the actuation of a first user input unit (12), a light source (50, 52) disposed in a housing (10) of the measuring device, a modulated optical measurement signal (42) is emitted in the direction of a target object (46) whose distance from the measuring device is to be ascertained, in which by the actuation of at least one further user input unit (18), the light source (50, 52) disposed in the measuring device can be switched on and/or off.

8 Claims, 2 Drawing Sheets

DEVICE AND METHOD FOR OPTICAL DISTANCE MEASUREMENT

CROSS-REFERENCE

The invention described and claimed hereinbelow is also described in PCT/DE2003/001595 filed May 19, 2003 and in German Patent Application DE 102 39 435.0, filed Aug. 19, 2002. This German Patent Application, whose subject matter is incorporated here by reference, provides the basis for a claim of priority of invention under 35 U.S.C. 119 (a)-(d).

BACKGROUND OF THE INVENTION

The invention is based on a device for optical distance measurement and on a method for optical distance measurement.

Handheld laser distance measuring devices are known that on a top side of their housing have a user input unit with user input or control buttons or keys for activating a distance measurement. In known devices in the prior art, the user input unit for the measuring device comprises a group of keys to which different measurement functions are for instance assigned. The actual measurement function is activated by actuation of a measurement button, which is usually emphasized visually in some way.

In the known optical distance meter known as DLE 30 made by Robert Bosch GmbH, the actual measurement operation is realized—after the device is switched on—by actuation of a double-stroke button. Pressing lightly on the measurement button activates the light source that is integrated with the device, so that the device changes over to a so-called "pointer mode", in which for a certain period of time, the device emits a continuous, visible laser beam, which can serve to aim at a desired target object. Pressing the measurement button into its second switching position emits a modulated measurement signal of the measuring device, whose returning signal component is detected in the measuring device and evaluated in order to determine the distance between the measuring device and the target object aimed at. The measured value for the distance, ascertained by a control and evaluation unit integrated with the measuring device, is shown in a display of the measuring device.

If the measuring device remains in the "pointer mode" for longer than a predetermined length of time, the control and evaluation unit of the measuring device automatically switches the light source off again. The light source is also switched off once a distance measurement has been performed.

In the laser distance measuring device PD25 made by Hilti, a single key in one user input group is used not only to switch on the device, but also to activate a likewise time-limited "pointer function" by pressing this key again, and to start the actual distance measurement operation by reactuation of this key. Especially in the case of serial measurement, the measurement operation with this device thus requires many key actuations. Moreover, assigning different, multiple functions to one and the same key in a user input element is often the cause of mistakes in user control.

SUMMARY OF THE INVENTION

The device for optical distance measurement of the invention has a user input unit with at least one user control function for emitting a modulated optical measurement signal for the sake of a distance measurement. By activation of this user input unit, a light source integrated with the measuring device emits a modulated light signal in the direction of a target object. The measurement signal returning from the target object and detected by a receiver in the measuring device is used to ascertain the distance from the measuring device to the target object.

Advantageously, the measuring device of the invention has at least one further user input unit for emitting an optical signal. By means of this further user input unit, which in a specific exemplary embodiment may be a separate, additional key, a light source integrated with the measuring device can be activated, in order to aim at a target object. This control function can be used for the distance measurement regardless of the control functions and thus makes it possible for a light signal for aiming the measuring device to be made available in a simple way.

The method for optical distance measurement on which the invention is based, in particular for optical distance measurement by means of a handheld measuring device, in which via the actuation of a first user input unit, a light source disposed in a housing of the measuring device, a modulated optical measurement signal (42) is emitted in the direction of a target object (46) whose distance from the measuring device is to be ascertained, characterized in that by the actuation of at least one further user input unit (18), the light source (50, 52) disposed in the measuring device can be switched on and/or off.

Advantageously, by means of the at least one further user input unit, the at least one light source of the device of the invention for optical distance measurement can be switched on and off. In this way, it is possible to operate the device of the invention in a continuous function. In this "continuous mode", the measuring device makes it easier to aim at the target area, since in the conventional "pointer mode" of the measuring devices in the prior art, the laser is deactivated after a certain length of time.

The device for optical distance measurement of the invention, and the method of the invention based on it, furthermore make it possible to simplify user control of the measuring device. Assigning double or multiple control functions to the user input units, which leads to possible mistakes in user control, is largely avoided in the device of the invention. The continuous laser function is clearly identified by a separate user input unit along with an associated symbol, so that simple user control of the measuring device is possible even independently of a distance measurement.

Especially in the case of measurement series with many individual measurements, the method of the invention and the device of the invention for performing this method have a clear advantage in terms of use over corresponding measuring devices in the prior art.

If many measurements must be performed by the user, it is helpful, and from the standpoint of ease of use of the measuring device also desirable, for the number of required key actuations for ascertaining the measurement results to be reduced. This can advantageously be achieved by means of the continuous laser function of the measuring device of the invention. By actuation of the at least one further user input unit, the light source of the can be switched over to continuous operation. After the target area is aimed at, the first time pressure is exerted on the measurement key of the first user input unit of the measuring device, a measurement is immediately tripped, and the light source that emits the modulated measurement signal remains on after the conclusion of the measurement, so that the next time the measurement key is pressed, the next distance measurement is performed. With the method of the invention, it is no longer necessary to perform a first key actuation to trip the "pointer mode" for aiming at the target area, then to press again on a key to trip the measurement for each individual measurement of the many measurements within a series of measurements. Thus the requisite number of key actuations is reduced by virtually half.

Advantageously, the at least one further user input unit, for activating the continuous laser function by means of a key specifically intended for that is mounted with an associated symbol, intuitively accessible to the user, on the user control side of the measuring device in such a way that without reading the instruction manual for the device, a user of the device of the invention will find the continuous laser function and can use it properly.

The second user input unit for realizing a continuous laser function is also disposed in the immediate vicinity of a measurement key of the first user input unit, so that both of these two keys are easily accessible and can be actuated without fumbling.

Further advantages of the device and method of the invention will become apparent from the drawing and the associated description.

BRIEF DESCRIPTION OF THE DRAWINGS

The drawing shows an exemplary embodiment of the device of the invention for optical distance measurement, described in further detail in the ensuing description. The drawing figures, their description, and the claims directed to the invention include numerous characteristics in combination. One skilled in the art will also consider these characteristics and the claims directed to them individually and put them together to make further useful combinations and claims.

Shown are

DETAILED DESCRIPTION OF THE PREFERRED EMBODIMENTS

Figure 1:
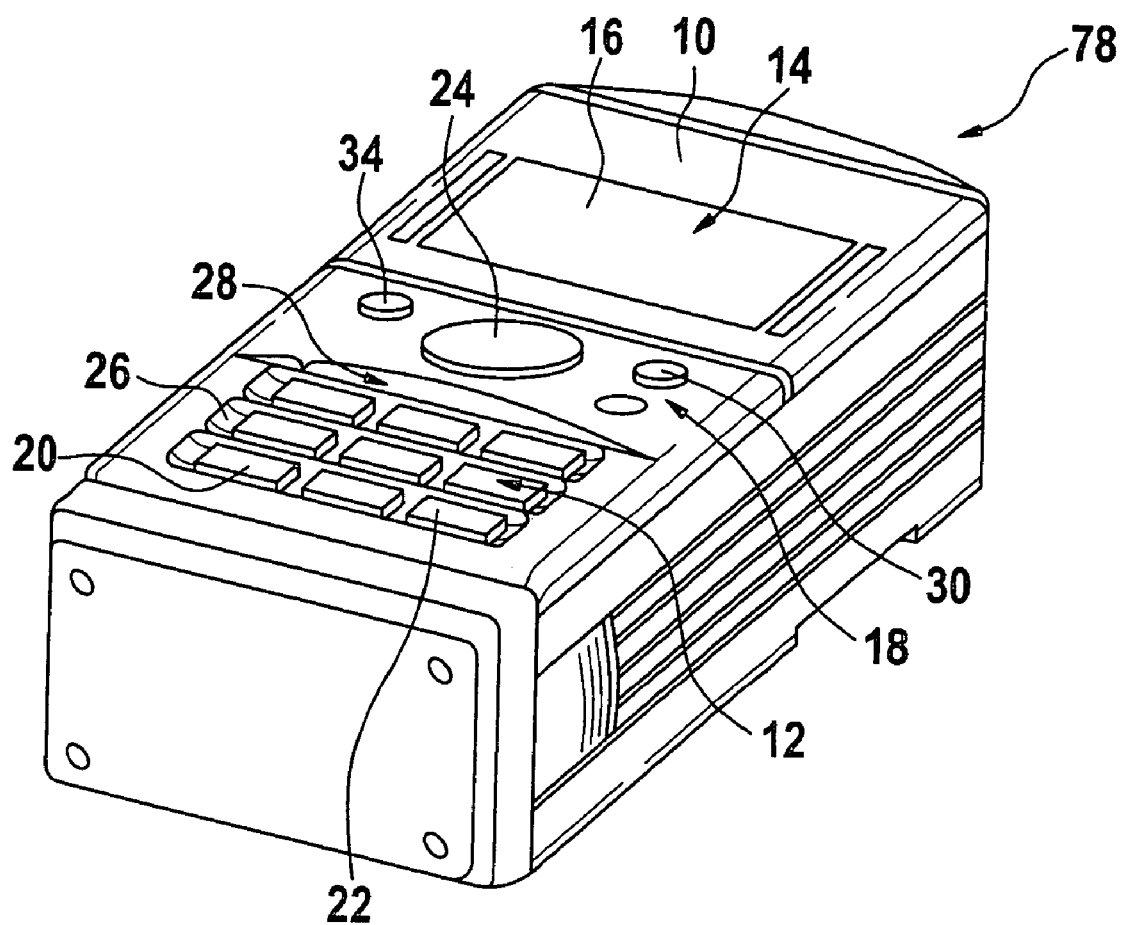
FIG. 1, a device according to the invention for optical distance measurement, in a perspective view seen obliquely from above.

FIG. 1 shows a handheld laser distance measuring device, as an exemplary embodiment of the device for optical distance measurement of the invention. The laser distance measuring device of FIG. 1 has a housing 10, with which a first user input unit 12, an output unit 14 in the form of a graphic display 16, and a second user input unit 18 are integrated. The first user input unit 12 includes an input unit 20 with user input keys 22 for selecting a measurement mode, such as a length measurement, area measurement, or volumetric measurement. Also belonging to the first user input unit 12 is a measurement key 24 for tripping a measurement operation for determining the distance. The control keys 22 of the first user input unit are sunk into indentations 26 in the housing 10 and differ clearly in their shape and size from the measurement key 24.

The measurement key 24 and the second user input unit 18, disposed in the immediate vicinity of the measurement key 24, are separated from the control keys 22 of the first user input unit by a riblike raised area 28.

The second user input unit 18, in the exemplary embodiment of FIG. 1, is formed by a key 30 with an associated graphic symbol 32. By actuation of the key 30, the light source integrated with the housing 10 of the measuring device is activated, and a shutter optionally also integrated with the device is opened, so that the measuring device emits a continuous light signal. Not until the key 30 is actuated again, or the device is disconnected from the power supply, is this continuous light signal switched off again. However, it may also be provided that a shutoff of the light source or of the entire measuring device takes place by way of a suitably programmed time lag. This has the advantage of protecting the measuring device against unintentionally being in continuous operation.

Advantageously, the key 30 for actuating a "continuous light mode" of the measuring device of the invention can also be sunk into the housing of the measuring device. In this way, an unintentional tripping of the "continuous light mode is securely prevented, and a risk to third persons by the continuously emitted laser beam is avoided.

In this "continuous light mode", a target object can be aimed at in a simple way. If in this mode, that is, after actuation of the key 30, the measurement key 24 of the measuring device is actuated, then the light source integrated with the device is frequency-modulated in its intensity via a control unit, and in accordance with the specifications of the user input keys 22, a measurement program is performed, for instance a simple length or area measurement. After this measurement operation is concluded, the modulation of the light source is terminated, but the light source of the measuring device itself remains activated. The outcome of the measurement program is shown on the graphic display 16 of the measuring device. If a further measurement is to be performed, for instance in the context of a volumetric determination, then the measurement key 24 need merely be activated again; this starts both the modulation of the measurement signal and the performance of the distance measurement.

The measuring device in the exemplary embodiment of FIG. 1 furthermore has a further user input unit 34, which upon actuation illuminates the graphic display 16 of the device.

Figure 2:
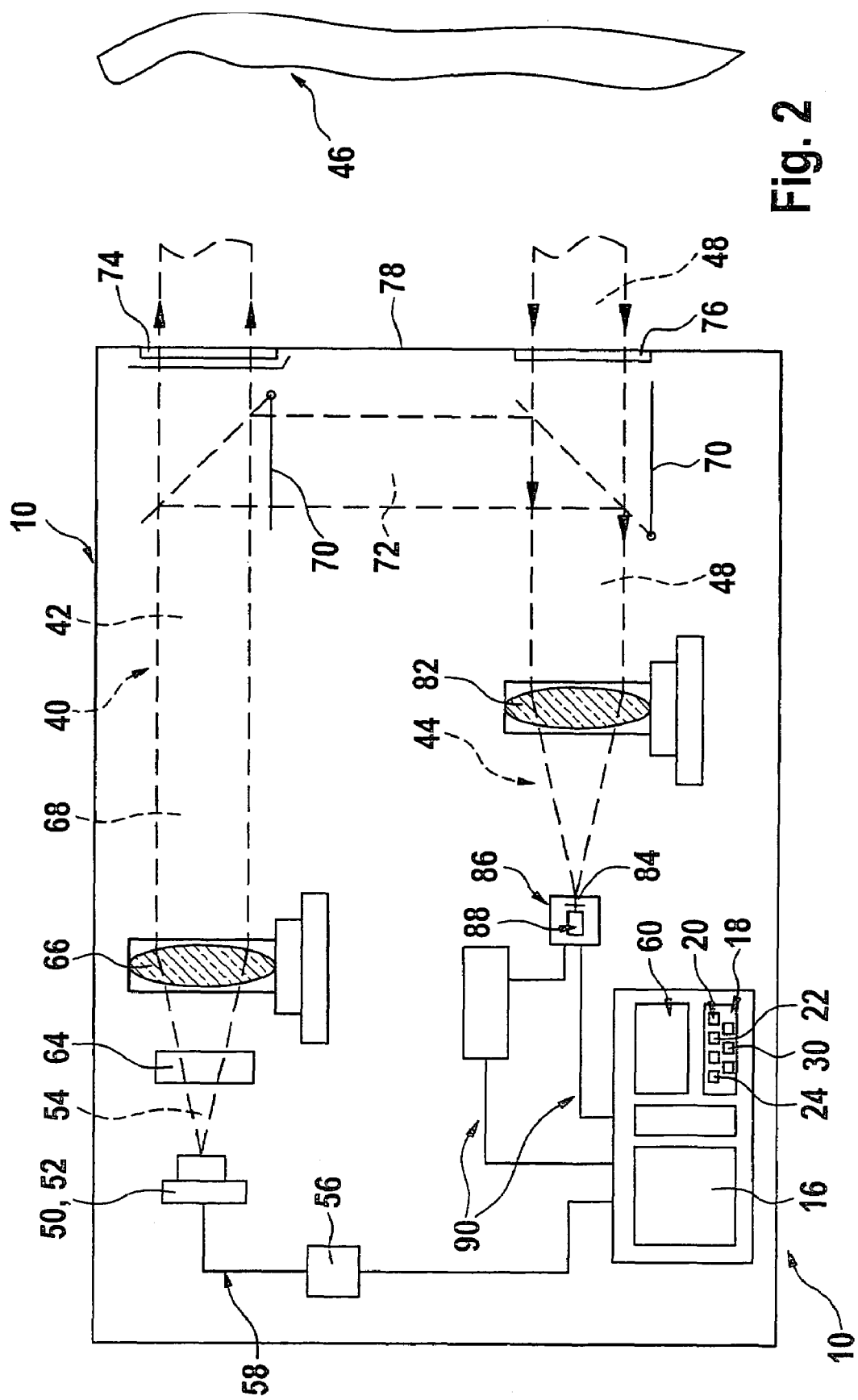
FIG. 2, a simplified, schematic total overview of the components of a device of the invention for optical distance measurement.

FIG. 2 schematically shows an optical distance measuring device with the most important components for describing its basic construction. The device has a housing 10, which may for instance be designed in accordance with the specifications of FIG. 1. In the housing 10, there is a transmitter branch 40 for generating an optical measurement signal 42 and a reception branch 44 for detecting the measurement signal 48 returning from a target object 46. The transmission branch 40, in addition to a number of components not further shown, in particular has a light source 50, which in the exemplary embodiment of FIG. 2 is formed by a semiconductor laser diode 52. The use of other light sources in the transmission branch 40 of the device of the invention is equally possible in other exemplary embodiments.

The laser diode 52 of the exemplary embodiment of FIG. 1 emits a light beam in the form of a beam 54 that is visible to the human eye. To that end, the laser diode 52 is operated via a control unit 56, which by means of suitable electronics can as needed generate a modulation of the electrical input signal 58 to the diode 52. The control unit 56 in turn receives the required frequency signals for modulating the laser diode 52 from a control and evaluation unit 60 of the measuring device of the invention.

In other exemplary embodiments of the device of the invention, the control unit 56 may also be a direct integral component of the control and evaluation unit 60.

Actuation of a user input key 22 calls up a measurement program stored in memory in the control and evaluation unit 60, and in accordance with the specifications of this measurement program, the 52 is triggered via the control unit 56. Upon actuation of the measurement key 24, a distance measurement is then performed in accordance with the specifications of the control and evaluation unit.

Conversely, if the key 30 of the measuring device of the invention is actuated, then in accordance with the specifications of the control and evaluation unit 60, the control unit 56 is triggered such that the laser diode 52 is switched on in an unmodulated way, so that only a continuous light signal is emitted, which exhibits slight variations in amplitude only as a consequence of statistical fluctuations. Within the context of the present invention, however, such a signal is considered to be unmodulated, since no modulation whatever is imposed on this signal. In this mode, the measuring device of the invention represents a continuous laser (CW mode), whose constantly emitted light signal can be used to aim at a target object 46 and to orient the measuring device in the desired way. By subsequent actuation of the measurement key 24, the control unit 56 switches over to a modulation mode for the laser diode 52, so that a distance measurement can be performed with this modulated light signal.

In alternative embodiments of the device of the invention and the method of the invention, provision is made so that the continuous operation of the light source ("continuous light mode") is also performed in a modulated way upon actuation of the key 30.

Alternatively, by a single actuation with slight pressure (or "light actuation" but nothing to do with visible light] of the measurement key 24, a "pointer mode" of the device of the invention can be established, with the result that for a predetermined time, the measuring device emits a light beam for aiming at the target object. If the measurement key 24 is depressed all the way in this mode, then a distance measurement between the measuring device and the target object 46 currently aimed at is performed. In contrast to the "continuous laser mode") to be achieved with the key 30 of the second user input unit 18, the control unit 56 switches the laser diode 52 off again after such a measurement, so that in the case of a serial measurement, the measurement key 24 must be returned to its first switching position again so that an aiming beam can be obtained for aiming at the target object 46 for the next measurement operation.

The control and evaluation unit 60 includes a circuit arrangement 62, which among other elements has at least one quartz oscillator for furnishing the required frequency signals for the modulation. By these signals, of which typically a plurality, with different frequencies, are used during one distance measurement, the optical measurement signal is modulated in a known way. The basic construction of such a device and the corresponding method for generating different measurement frequencies can be found for instance in German Patent DE 198 11 550 C2, so that reference is merely made to it here, and the contents of this reference is expressly incorporated into the present application but will not be addressed in further detail in the present description.

The intensity-modulated or unmodulated light beam 54 emerging from the semiconductor diode 52 of the measuring device passes through a first optical element 64, which leads to an improvement in the beam profile of the measurement beam. The measurement beam 54 then passes through a collimation lens 66, which generates a virtually parallel focused light beam 68, which is emitted by the device in the direction of a target object 46 to be measured.

In the transmission branch 40 of the device of the invention shown in FIG. 2, there is also a device 70 for generating a reference distance 72 internal to the device, with which an internal calibration of the measuring device can be performed. The measurement signal 42 is out-coupled from the housing 10 of the device through an optical window 74. For the actual measurement operation, the device is aimed at the desired target object 46. For that purpose, for instance by actuation of the key 30 on the top of the housing of the measuring device, the laser diode 52 can be switched to a "continuous laser model". In this mode, the measuring device emits a continuous, visible light beam, which makes it possible to aim at the desired target object 46 in a simple way. By actuation of the measurement key 24, a measurement operation is started for determining the distance between the measuring device and the target object 46, and in this operation a signal is transmitted by the control and evaluation unit 60 of the measuring device to the control unit 56, which then modulates the output signal of the laser diode 62 as required.

The signal 48 reflected from or scattered by the desired target object 46 returns again to a certain extent into the housing 10 of the device of the invention through an entry window 76. The measurement beam arriving through the entry window 76 at the face end 78 of the device forms a returning, virtually parallel measurement beam 80, which is directed to a receiving lens 82. The receiving lens 82 focuses the returning measurement beam to the active face 84 of a receiver 86.

The receiver 86 of the device of the invention has a photodiode, such as an avalanche photodiode 88, which converts the arriving light signal into an electrical signal in a known manner. The electrical signal is carried onward, via connecting means 90, to the control and evaluation unit 60 of the device. From the electrical signal, the control and evaluation unit 60 ascertains the distance sought between the device and the target object. The ascertained distance can be imparted to the user of the device, for instance in an optical display device, such as a graphic display 14.

The device of the invention and the method of the invention based on it are not limited to the exemplary embodiment shown in the drawings. In particular, the device of the invention is not limited to the use of a laser diode or some other kind of laser for generating an aiming or measurement signal.

Moreover, the method of the invention is not limited to determining the sought distance by means of a phase measurement method.

The invention claimed is:

1. A handheld device for optical distance measurement, having at least one light source (50, 52), disposed in a housing of the device, for generating an optical measurement signal, and having a first user input unit (12) with at least one user control function (24) for emitting a modulated, optical measurement signal for the sake of a distance measurement, wherein the device has at least one further user input unit (18) for emitting an optical signal (42), wherein the device permits the at least one further user input unit (18) to switch the at least one light source (50, 52) on and/or off.

2. The device of claim 1, wherein the light (42) of the light source (50, 52) of the device emitted by actuation of the at least one further user input unit (18) is unmodulated.

3. The device of claim 1, wherein the light (42) of the light source (50, 52) of the device, emitted by actuation of the at least one further user input unit (18), is in the spectral range that is visible to the human eye.

4. The device of claim 1, wherein the at least one light source (50, 52) of the device is a laser, in particular a semiconductor laser diode (52).

5. A method for optical distance measurement, in particular a method for optical distance measurement by means of a handheld measuring device, in which via the actuation of a first user input unit (12), a light source (50, 52) disposed in a housing (10) of the measuring device, a modulated optical measurement signal (42) is emitted in the direction of a target object (46) whose distance from the measuring device is to be ascertained, characterized in that by the actuation of at least one further user input unit (18), the light source (50, 52) disposed in the measuring device can be switched on and/or off.

6. The method of claim 5, wherein the light (42), emitted by the actuation of the at least one further user input unit (18), of the at least one light source (50, 52) disposed in the measuring device is emitted unmodulated, as long as the at least one first user input unit (12, 24) is not activated.

7. The method of claim 5, wherein by actuation of the first user input unit (12, 24) of the device, a distance measurement can be made, even if the second user input unit (18) of the instrument is activated.

8. The method of claim 5, wherein the light source (50, 52) disposed in the measuring device remains switched on between two distance measurements performed by means of the first user input unit (12, 24), if the light source (50, 52) has been switched on via the at least one further user input unit (18).

* * * * *